(12) United States Patent
Nagano et al.

(10) Patent No.: US 10,834,330 B2
(45) Date of Patent: Nov. 10, 2020

(54) VIDEO PROCESSOR, DISPLAY APPARATUS, AND VIDEO PROCESSING METHOD

(71) Applicant: SEIKO EPSON CORPORATION, Tokyo (JP)

(72) Inventors: Miki Nagano, Shiojiri (JP); Yoshihito Hayashi, Matsumoto (JP); Sachio Tsuboi, Matsumoto (JP); Isao Kobayashi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/379,126

(22) Filed: Apr. 9, 2019

(65) Prior Publication Data

US 2019/0238742 A1    Aug. 1, 2019

Related U.S. Application Data

(63) Continuation of application No. 15/616,068, filed on Jun. 7, 2017, now Pat. No. 10,298,855.

(30) Foreign Application Priority Data

Jun. 23, 2016  (JP) ................................ 2016-124817

(51) Int. Cl.
*H04N 5/57*  (2006.01)
*H04N 5/235*  (2006.01)
*H04N 5/243*  (2006.01)
*G06F 3/14*  (2006.01)
*G09G 5/10*  (2006.01)
(Continued)

(52) U.S. Cl.
CPC ............. *H04N 5/2355* (2013.01); *G06F 3/14* (2013.01); *G09G 5/00* (2013.01); *G09G 5/10* (2013.01); *H04N 5/23232* (2013.01); *H04N 5/243* (2013.01); *H04N 5/57* (2013.01); *G09G 2320/0271* (2013.01); *G09G 2320/0285* (2013.01); *G09G 2320/0613* (2013.01); *G09G 2320/0626* (2013.01); *G09G 2370/04* (2013.01);
(Continued)

(58) Field of Classification Search
CPC combination set(s) only.
See application file for complete search history.

(56) References Cited

U.S. PATENT DOCUMENTS

2012/0154355 A1*  6/2012  Kawai ................. G09G 3/2007
                                                            345/207
2013/0182185 A1*  7/2013  Koyama ............. H04N 1/6027
                                                            348/672
(Continued)

FOREIGN PATENT DOCUMENTS

JP       2014-532195 A     12/2014
JP       2016-34125 A       3/2016
(Continued)

*Primary Examiner* — Wesner Sajous
(74) *Attorney, Agent, or Firm* — Oliff PLC

(57) ABSTRACT

A video processor includes a receiving section that receives video information representing video images and luminance-related information on the luminance of the video images and a video processing section that determines an expansion target luminance range of the video images based on the luminance-related information and expands the expansion target luminance range in such a way that the maximum luminance in the expansion target luminance range increases.

13 Claims, 7 Drawing Sheets

(51) Int. Cl.
    *G09G 5/00*     (2006.01)
    *H04N 5/232*     (2006.01)

(52) U.S. Cl.
    CPC ... *G09G 2370/042* (2013.01); *G09G 2370/12* (2013.01)

(56) References Cited

U.S. PATENT DOCUMENTS

| | | |
|---|---|---|
| 2014/0210847 A1 | 7/2014 | Knibbeler et al. |
| 2014/0225941 A1 | 8/2014 | Van der Vleuten et al. |
| 2016/0100183 A1 | 4/2016 | Yamamoto et al. |
| 2016/0203752 A1* | 7/2016 | Hayashi ............... G09G 3/2003 345/694 |
| 2016/0210730 A1 | 7/2016 | Eto et al. |
| 2017/0018251 A1* | 1/2017 | Miller ................... G09G 5/005 |
| 2017/0293205 A1* | 10/2017 | Iwata ................. H04N 1/00458 |
| 2017/0310938 A1* | 10/2017 | Okamura ................. H04N 5/20 |
| 2017/0318358 A1* | 11/2017 | Eyer ................ H04N 21/44008 |
| 2017/0330312 A1* | 11/2017 | Nam ..................... H04N 5/202 |
| 2018/0048875 A1* | 2/2018 | Park ..................... H04N 13/133 |
| 2018/0199050 A1 | 7/2018 | Yamamoto et al. |
| 2018/0302663 A1 | 10/2018 | Yoshizawa et al. |
| 2019/0156471 A1 | 5/2019 | Knibbeler et al. |
| 2019/0172187 A1 | 6/2019 | Knibbeler et al. |

FOREIGN PATENT DOCUMENTS

| | | |
|---|---|---|
| JP | 2017-069937 A | 4/2017 |
| WO | 2014203747 A | 12/2014 |

\* cited by examiner

| MODE | Max Content Light Level (MCLL) (cd/m2 = nit) | Max Frame-average Light Level (MFaLL) (cd/m2 = nit) | EXPANSION TARGET LUMINANCE RANGE (cd/m² = nit) | EXPANDED LUMINANCE RANGE (cd/m² = nit) |
|---|---|---|---|---|
| HDR0 | 0≦MCLL＜500 | 0≦MFaLL＜200 | 0≦DR≦500 | 0≦DR≦10000 |
| HDR1 | 500≦MCLL＜1000 | 200≦MFaLL＜400 | 0≦DR≦1000 | 0≦DR≦10000 |
| HDR2 | 1000≦MCLL＜2000 | 400≦MFaLL＜800 | 0≦DR≦2000 | 0≦DR≦10000 |
| HDR3 | 2000≦MCLL＜4000 | 800≦MFaLL＜1600 | 0≦DR≦4000 | 0≦DR≦10000 |
| HDR4 | 4000≦MCLL | 1600≦MFaLL | 0≦DR≦10000 | 0≦DR≦10000 |

LUT1

FIG. 2

| MODE | Max Display Mastering Luminance (MaxDML) (cd/m2 = nit) | EXPANSION TARGET LUMINANCE RANGE (cd/m2 = nit) | EXPANDED LUMINANCE RANGE (cd/m2 = nit) |
|---|---|---|---|
| HDR0 | $0 \leq MaxDML < 1000$ | $0 \leq DR \leq 1000$ | $0 \leq DR \leq 10000$ |
| HDR1 | $1000 \leq MaxDML < 2000$ | $0 \leq DR \leq 2000$ | $0 \leq DR \leq 10000$ |
| HDR2 | $2000 \leq MaxDML < 4000$ | $0 \leq DR \leq 4000$ | $0 \leq DR \leq 10000$ |
| HDR3 | $4000 \leq MaxDML < 8000$ | $0 \leq DR \leq 8000$ | $0 \leq DR \leq 10000$ |
| HDR4 | $8000 \leq MaxDML$ | $0 \leq DR \leq 10000$ | $0 \leq DR \leq 10000$ |

FIG. 6

VIDEO PROCESSOR, DISPLAY APPARATUS, AND VIDEO PROCESSING METHOD

This is a Continuation of application Ser. No. 15/616,068 filed Jun. 7, 2017, which in turn claims the benefit of Japanese Patent Application No. 2016-124817, filed Jun. 23, 2016. The disclosure of the prior applications is hereby incorporated by reference herein in its entirety.

BACKGROUND

1. Technical Field

The present invention relates to a video processor, a display apparatus, and a video processing method.

2. Related Art

As a new method relating to video images, an HDR (high dynamic range) method has been known (see JP-A-2016-34125). In the HDR method, a luminance of 10000 nit is specified as the maximum luminance. It is noted that 1 nit is 1 $cd/m^2$.

In an HDR display apparatus that supports the HDR method, the display brightness range corresponds to the range of luminance that HDR video information compliant with the HDR method can take on (specifically, luminance range from 0 to 10000 nit). For example, an HDR display apparatus, when displaying video images represented by HDR video information, displays a video image portion having a luminance of 10000 nit with the brightest white (brightest portion in display brightness range).

It is noted that all pieces of HDR video information do not represent video images having the luminance of 10000 nit. For example, in the UHD-BD (ultra-high definition Blu-ray (registered trademark) disc) standard, the maximum luminance is limited to 1000 nit. Therefore, when HDR video information representing video images having maximum luminance lower than 10000 nit is inputted to an HDR display apparatus, part of the brightness range of the HDR display apparatus, that is, the brightness range portion corresponding to the luminance range from the maximum luminance of the HDR video information to 10000 nit is not used, and dark, low-contrast video images are therefore undesirably displayed.

SUMMARY

An advantage of some aspects of the invention is to provide a technology for broadening the luminance range of video images represented by video information to increase the brightness of the video images.

An aspect of a video processor according to the invention includes a receiving section that receives video information representing video images and luminance-related information on luminance of the video images and a video processing section that determines an expansion target luminance range of the video images based on the luminance-related information and expands the expansion target luminance range in such a way that maximum luminance in the expansion target luminance range increases.

According to the aspect described above, since the expansion target luminance range is so expanded that the maximum luminance in the expansion target luminance range of the video images increases, the video images can be brighter and have higher contrast than in a case where the luminance range of the video images is not expanded. Further, since the expansion target luminance range is determined on the basis of the luminance-related information, the expansion target luminance range can be determined in accordance, for example, with the luminance of the video images.

In the aspect of the video processor, it is preferable that the image processing section expands the expansion target luminance range in such away that the maximum luminance in the expansion target luminance range is equal to pre-specified target maximum luminance higher than the maximum luminance.

According to the aspect described above, since the maximum luminance in the expansion target luminance range is converted into the pre-specified target maximum luminance higher than the maximum luminance, the maximum luminance in the expanded luminance range can be set at a fixed target maximum luminance. Therefore, for example, when the video information having the expanded expansion target luminance range is inputted to the display section, and the target maximum luminance is set at the maximum in the luminance range that the display section can handle, the highest-luminance video image portion of the video images can be displayed by using the brightest portion in the brightness range of display operation performed by the display section. The video images can therefore be brightest possible video images.

In the aspect of the video processor, it is preferable that the image processing section lowers the maximum luminance in the expansion target luminance range by a greater amount when luminance represented by the luminance-related information is lower.

According to the aspect described above, the lower the luminance represented by the luminance-related information, the lower the maximum luminance in the expansion target luminance range, and the maximum luminance is converted into the pre-specified target maximum luminance. Therefore, the lower the luminance represented by the luminance-related information, the higher the degree of increase in the maximum luminance in the expansion target luminance range.

In the aspect of the video processor, it is preferable that the luminance-related information is maximum luminance information representing maximum luminance of the video images.

According to the aspect described above, the expansion target luminance range can be determined in accordance with the maximum luminance of the video images. In the HDMI (high-definition multimedia interface (registered trademark)) standard, the maximum luminance information is written in Info Frame. The receiving section can therefore readily receive the maximum luminance information by receiving Info Frame compliant with the HDMI standard.

In the aspect of the video processor, it is preferable that the luminance-related information is maximum average luminance information representing a maximum of average luminance values of frames that form the video images.

According to the aspect described above, the expansion target luminance range can be determined in accordance with the maximum of average luminance values of the frames that form the video images. In the HDMI standard, the maximum average luminance information is written in Info Frame. The receiving section can therefore readily receive the maximum average luminance information by receiving Info Frame compliant with the HDMI standard.

In the aspect of the video processor, it is preferable that the luminance-related information is point-of-editing maximum luminance information representing maximum luminance of light from a display apparatus used when the video images are edited.

According to the aspect described above, the expansion target luminance range can be determined in accordance with the maximum luminance of light from a display apparatus used when the video images are edited. In the HDMI standard, the point-of-editing maximum luminance information is written in Info Frame. The receiving section can therefore readily receive the point-of-editing maximum luminance information by receiving Info Frame compliant with the HDMI standard.

In the aspect of the video processor, it is preferable that the receiving section receives the luminance-related information formed of a plurality of types of luminance-related information, and that the image processing section determines the expansion target luminance range for each of the pieces of luminance-related information and expands one of the expansion target luminance ranges for the pieces of the luminance-related information, an expansion target luminance range having lowest maximum luminance, in such a way that the maximum luminance in the expansion target luminance range having the lowest maximum luminance increases.

According to the aspect described above, the video images can be brighter and have higher contrast than in a case where the image processing section expands one of the expansion target luminance ranges for the pieces of luminance-related information, an expansion target luminance range having the highest maximum luminance, in such a way that the maximum luminance in the expansion target luminance range increases.

In the aspect of the video processor, it is preferable that the receiving section receives the luminance-related information formed of a plurality of types of luminance-related information, and that the image processing section determines the expansion target luminance range for each of the pieces of luminance-related information and expands one of the expansion target luminance ranges for the pieces of the luminance-related information, an expansion target luminance range having highest maximum luminance, in such a way that the maximum luminance in the expansion target luminance range having the highest maximum luminance increases.

According to the aspect described above, luminance saturation due to the expansion of the luminance range can be suppressed as compared with a case where the image processing section expands one of the expansion target luminance ranges for the pieces of luminance-related information, an expansion target luminance range having the lowest maximum luminance, in such a way that the maximum luminance in the expansion target luminance range increases.

In the aspect of the video processor, it is preferable that the plurality of types of luminance-related information are formed of maximum luminance information representing maximum luminance of the video images and maximum average luminance information representing a maximum of average luminance values of frames that form the video images.

According to the aspect described above, the expansion target luminance range can be determined by using a plurality of types of luminance-related information written in Info Frame compliant with the HDMI standard.

In the aspect of the video processor, it is preferable that the plurality of types of luminance-related information are formed of maximum luminance information representing maximum luminance of the video images, maximum average luminance information representing a maximum of average luminance values of frames that form the video images, and point-of-editing maximum luminance information representing maximum luminance of light from a display apparatus used when the video images are edited.

According to the aspect described above, the expansion target luminance range can be determined by using the plurality of types of luminance-related information written in Info Frame compliant with the HDMI standard.

In the aspect of the video processor, it is preferable that the receiving section is capable of receiving the luminance-related information formed of a plurality of types of luminance-related information, that the plurality of types of luminance-related information include maximum luminance information representing maximum luminance of the video images, maximum average luminance information representing a maximum of average luminance values of frames that form the video images, and point-of-editing maximum luminance information representing maximum luminance of light from a display apparatus used when the video images are edited, and that when the receiving section receives at least one of the maximum luminance information and the maximum average luminance information, the image processing section determines the expansion target luminance range based on the received information, whereas when the receiving section receives neither the maximum luminance information nor the maximum average luminance information but receives the point-of-editing maximum luminance information, the image processing section determines the expansion target luminance range based on the point-of-editing maximum luminance information.

According to the aspect described above, as the luminance-related information used to determine the expansion target luminance range, the maximum luminance information and the maximum average luminance information are allowed to have priority over the point-of-editing maximum luminance information.

The maximum luminance information and the maximum average luminance information change in accordance with the luminance of the video images themselves, whereas the point-of-editing maximum luminance information does not change with the luminance of the video images themselves but changes with the maximum luminance that the video images can take on. Therefore, according to the aspect described above, the luminance-related information (maximum luminance information or maximum average luminance information) that is more likely to represent the luminance range of the video images than the point-of-editing maximum luminance information can be used to determine the expansion target luminance range.

In the aspect of the video processor, it is preferable that, when the receiving section does not receive the luminance-related information but receives the video information, the image processing section determines a pre-specified luminance range of the video images as the expansion target luminance range.

According to the aspect described above, even in a case where the receiving section receives no luminance-related information, the expansion target luminance range can be determined.

An aspect of a display apparatus according to the invention includes the image processor described above and a display section that displays video images according to the video information representing the expansion target luminance range having been expanded.

According to the aspect described above, brighter, higher-contrast video images can be displayed than in a case where video images according to video information representing an expansion target luminance range that has not been expanded are displayed.

An aspect of a video processing method according to the invention includes receiving video information representing video images and luminance-related information on luminance of the video images, and determining an expansion target luminance range of the video images based on the luminance-related information and expanding the expansion target luminance range in such a way that maximum luminance in the expansion target luminance range increases.

According to the aspect described above, since the expansion target luminance range is so expanded that the maximum luminance in the expansion target luminance range of the video images increases, the luminance range of the video images can be so broadened that the video images are brighter than in a case where the luminance range of the video images is not expanded. Further, since the expansion target luminance range is determined on the basis of the luminance-related information, the expansion target luminance range can be changed in accordance with the luminance-related information.

BRIEF DESCRIPTION OF THE DRAWINGS

The invention will be described with reference to the accompanying drawings, wherein like numbers reference like elements.

FIG. 2 shows an example of a lookup table.

FIG. 6 shows another example of the lookup table.

DESCRIPTION OF EXEMPLARY EMBODIMENTS

Figure 1:
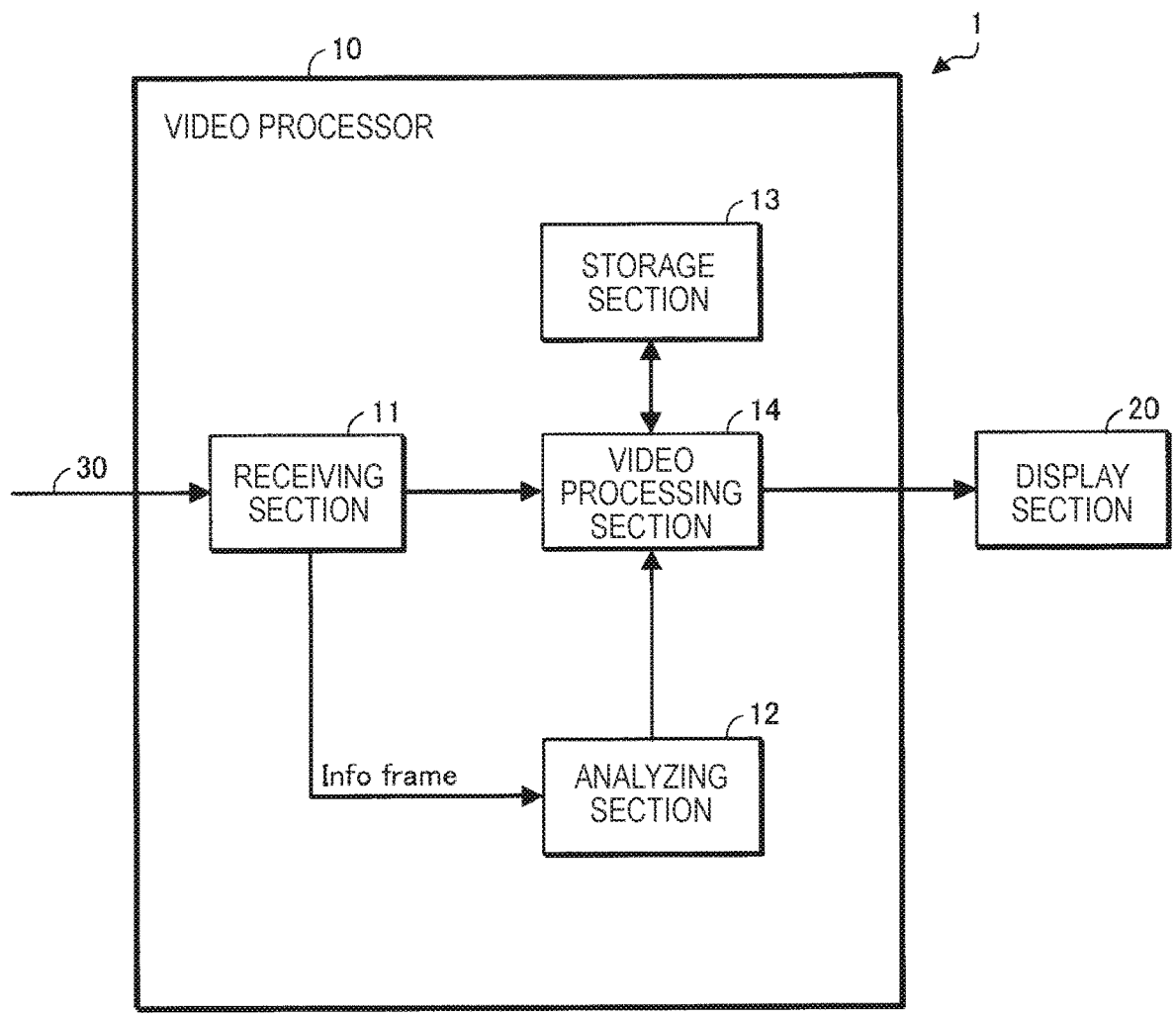
FIG. 1 shows a display apparatus according to a first embodiment that adopts the invention.

Embodiments according to the invention will be described below with reference to the drawings. In the drawings, the dimension and scale of each portion differ from actual values as appropriate. Further, since the embodiments described below are preferable specific examples of the invention, a variety of technically preferable restrictions are imposed on the embodiments. The scope of the invention is, however, not limited to the restricted forms unless otherwise particularly stated in the following description that a restriction is imposed on the invention.

First Embodiment

FIG. 1 shows a display apparatus 1 according to a first embodiment that adopts the invention.

The display apparatus 1 is an HDR display apparatus that supports the HDR method and is, for example, a projector. A projector is currently required to display brightest possible video images. The requirement is not limited to a projector and is common to other display apparatus.

The display apparatus 1 includes a video processor 10 and a display section 20. The brightness range of display operation performed by the display section 20 corresponds to the range of luminance that HDR video information compliant with the HDR method can take on (luminance range from 0 to 10000 nit). The video processor 10 includes a receiving section 11, an analyzing section 12, a storage section 13, and a video processing section 14.

The receiving section 11 receives a signal compliant with the HDMI standard (hereinafter referred to as "HDMI signal") via an HDMI cable 30.

The HDMI signal contains video information representing video images. In the following description, the video information contained in an HDMI signal is referred to as "first video information," and video images represented by the first video information are referred to as "first video images."

The HDMI signal further contains Info Frame. In the Info Frame is written luminance-related information on the luminance of the first video images. Examples of the luminance-related information may include MCLL (maximum content light level) information, MFaLL (maximum frame-average light level) information, and MaxDML (maximum display mastering luminance) information.

The MCLL information is maximum luminance information representing the maximum luminance of the first video images. The MFaLL information is maximum average luminance information representing the maximum of average luminance values of the frames that form the first video images. The MaxDML information is point-of-editing maximum luminance information representing the maximum luminance of light from a display apparatus used when the first video images are edited.

EOTF (electro optical transfer function) information is further written in Info Frame. The EOTF information can be used as information representing whether the first video images comply with the HDR method or an SDR (standard dynamic range) method.

The receiving section 11 supplies the analyzing section 12 with Info Frame and supplies the video processing section 14 with the first video information.

The analyzing section 12 analyzes Info Frame to read the information written in Info Frame (luminance-related information and EOTF information, for example). The analyzing section 12 supplies the video processing section 14 with the information read from Info Frame.

The storage section 13 stores a variety of pieces of information. The storage section 13 stores, for example, a lookup table LUT1 showing the relationship among the luminance-related information, an expansion target luminance range, and an expanded luminance range.

FIG. 2 shows an example of the lookup table LUT1.

The expansion target luminance range is a range taken as the dynamic range of the luminance (range from minimum luminance to maximum luminance) of the first video images. The expansion target luminance range is determined on the basis of the luminance-related information.

In FIG. 2, the MCLL information and the MFaLL information are used as the luminance-related information.

In FIG. 2, the luminance-related information, the expansion target luminance range, and the expanded luminance range are stored on a mode basis. For example, the MCLL information greater than or equal to 500 nit but smaller than 1000 nit is related to the expansion target luminance range greater than or equal to 0 nit but smaller than or equal to 1000 nit and the expanded luminance range greater than or equal to 0 nit but smaller than or equal to 10000 nit. The MFaLL information greater than or equal to 400 nit but smaller than 800 nit is related to the expansion target luminance range greater than or equal to 0 nit but smaller than or equal to 2000 nit and the expanded luminance range greater than or equal to 0 nit but smaller than or equal to 10000 nit.

The video processing section 14 corrects the first video information received from the receiving section 11 on the basis of the luminance-related information received from the analyzing section 12 to generate second video information.

In the present embodiment, the video processing section 14 refers to the lookup table LUT1 and determines the expansion target luminance range of the first video images on the basis of the luminance-related information. The video processing section 14 then expands the expansion target luminance range to an expanded luminance range in such a way that the maximum luminance in the expansion target luminance range increases to generate second video information having the expanded luminance range.

The video processing section 14 supplies the display section 20 with the second video information. The display section 20 displays video images according to the second video information (hereinafter referred to as "second video images").

A technical meaning of the action in which the video processor 10 corrects the first video information to generate the second video information will now be described.

The brightness range of display operation performed by the display section 20 corresponds to the range of luminance that HDR video information can take on (luminance range from 0 to 10000 nit). The first video information, however, does not necessarily represent video images having the luminance of 10000 nit.

Consider now a case where the first video information is directly inputted to the display section 20.

In this case, when the first video information represents video images that do not have the luminance of 10000 nit, the display section 20 does not use the maximum brightness in the range of brightness that the display section 20 can output. In detail, for example, in a case where the first video information represents video images having a maximum luminance of 1000 nit (video images compliant with UHD-BD standard), the display section 20 does not use brightness values that belong to the range of brightness that the display section 20 can output and correspond to luminance values greater than 1000 nit but smaller than or equal to 10000 nit. Images displayed by the display section 20 are therefore undesirably dark, low-contrast images.

To address the problem described above, in the present embodiment, the image processing section 14 first refers to the lookup table LUT1 and determines the expansion target luminance range corresponding to the luminance-related information (range taken as dynamic range of luminance of first video images). The image processing section 14 subsequently expands the expansion target luminance range to an expanded luminance range in such a way that the maximum luminance in the expansion target luminance range is the maximum luminance (10000 nit) in the range of luminance that HDR video information compliant with the HDR method can take on to generate second video information. The image processing section 14 then supplies the display section 20 with the second video information.

The display section 20 therefore uses the maximum brightness in the range of brightness that the display section 20 can output to display second video images according to the second video information. The second video images are therefore brighter than the first video images. In this process, since the luminance range used to display the second video images (expanded luminance range) is wider than the luminance range used to represent the first video images, the second video images have contrast higher than that of the first video images.

As described above, in the present embodiment, the first video information is not directly inputted to the display section 20, but the video processor 10 uses the first video information and the luminance-related information to generate the second video information representing the second video images that are brighter than the first video images and have contrast higher than that of the first video image and supplies the display section 20 with the second video information.

The maximum luminance in the expanded luminance range (10000 nit) is a fixed value, as shown in FIG. 2, and equal to the maximum luminance in the range of luminance that HDR video information can take on (10000 nit). When the maximum luminance in the expanded luminance range is equal to the maximum luminance in the range of luminance that HDR video information can take on, a highest-luminance video portion of the second video images can be displayed by using the brightest portion of the brightness range of display operation performed by the display section 20. The second video images can therefore be brightest possible video images.

It is noted that the maximum luminance in the expanded luminance range (10000 nit) is an example of pre-specified target maximum luminance higher than the maximum luminance in the expansion target luminance range. The target maximum luminance may be lower than 10000 nit.

The image processing section 14 lowers the maximum luminance in the expansion target luminance range by a greater amount when the luminance represented by the luminance-related information (MCLL information and MFaLL information shown in FIG. 2) is lower (see FIG. 2). This point will be described below.

The MCLL information represents the maximum in the dynamic range of luminance of the first video images. The expansion target luminance range is the range taken as the dynamic range of luminance of the first video images. The image processing section 14 can therefore increase the degree of coincidence between the expansion target luminance range and the dynamic range of luminance of the first video images by lowering the maximum luminance in the expansion target luminance range by a greater amount when the luminance represented by the MCLL information is lower.

When a higher degree of coincidence between the expansion target luminance range and the dynamic range of luminance of the first video images is achieved, second video information representing brighter, higher-contrast second video images can be generated with degradation in the second video images due to the expansion of the luminance range suppressed.

The MFaLL information represents the maximum of average luminance values of the frames that form the first video images. It is anticipated that the lower the MFaLL information, the higher the probability of a small maximum in the dynamic range of luminance of the first video images.

The image processing section 14 can therefore increase the degree of coincidence between the expansion target luminance range and the dynamic range of luminance of the first video images by lowering the maximum luminance in the expansion target luminance range by a greater amount when the luminance represented by the MFaLL information is lower. Second video information representing brighter, higher-contrast second video images can therefore be generated with degradation in the second video images due to the expansion of the luminance range suppressed, as described above.

Figure 3:
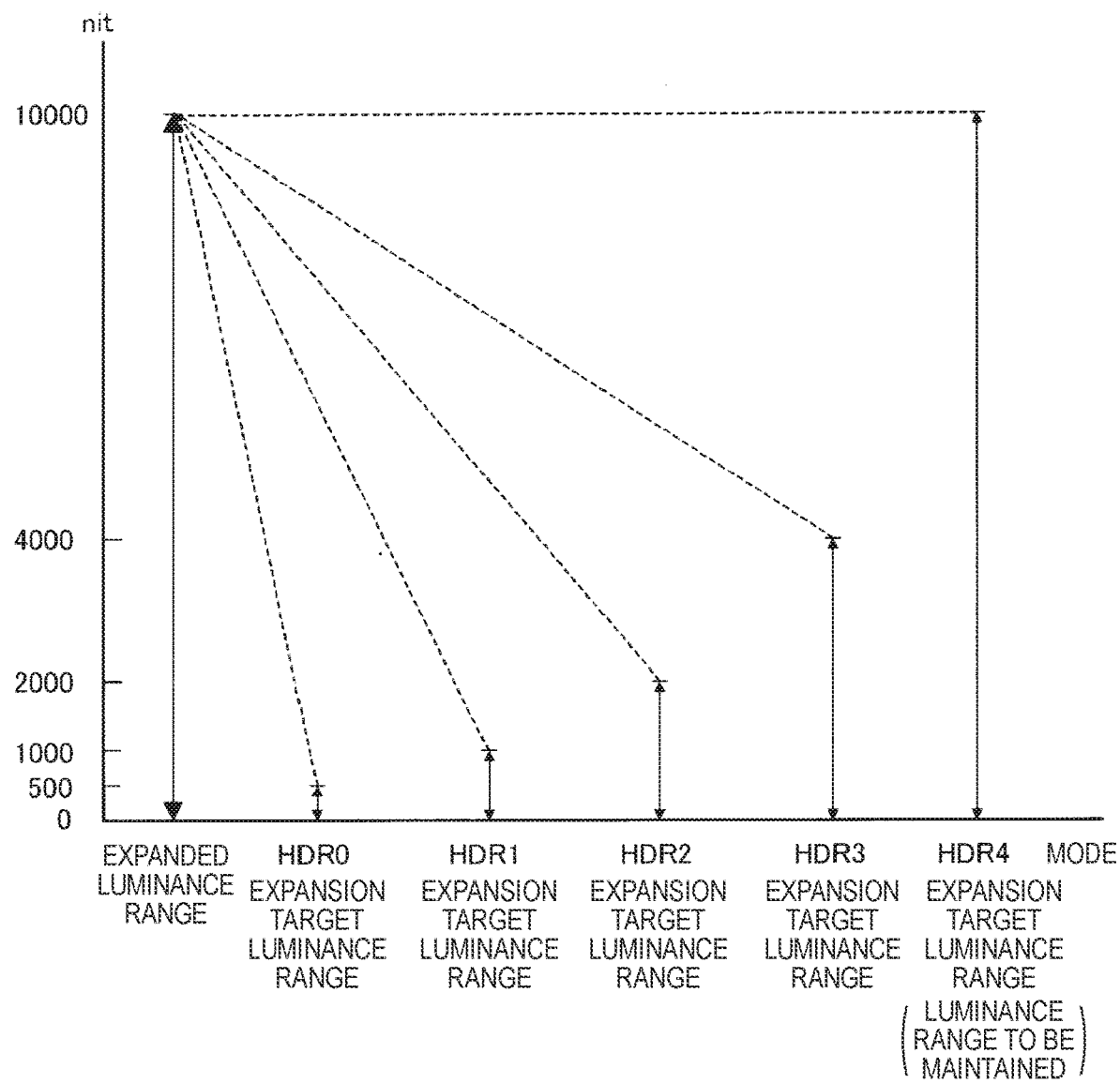
FIG. 3 shows an aspect of expansion of a luminance range in each mode.

The image processing section 14 has six modes, specifically, an HDR0 mode to an HDR4 mode and an SDR mode. The SDR mode is a mode corresponding to the SDR method. The action of the image processing section 14 in the SDR mode is known and will not therefore be described in detail. The HDR0 to HDR4 modes are modes corresponding to the HDR method. FIG. 3 shows the relationship among the HDR0 to HDR4 modes, the expansion target luminance range, and the expanded luminance range.

In the HDR0 to HDR3 modes, the process of expanding the luminance range of the first video images is carried out, as shown in FIGS. 2 and 3.

The HDR0 mode is a mode used when the expansion target luminance range (range taken as dynamic range of luminance of first video images) is determined to be "greater than or equal to 0 nit but smaller than or equal to 500 nit" on the basis of the luminance-related information (MCLL information or MFaLL information).

In the HDR0 mode, the image processing section 14 generates the second video information by expanding the expansion target luminance range of the first video images that is "greater than or equal to 0 nit but smaller than or equal to 500 nit" (maximum luminance of 500 nit) to an expanded luminance range that is "greater than or equal to 0 nit but smaller than or equal to 10000 nit" (target maximum luminance of 10000 nit). In the HDR0 mode, the maximum luminance of 500 nit in the expansion target luminance range of the first video images is converted into the target maximum luminance of 10000 nit.

The degree of expansion of the expansion target luminance range in the HRD0 mode is 20 times. In the HDR0 mode, the image processing section 14 generates the second video information by correcting the portion of the first video images that has luminance that belongs to the expansion target luminance range "greater than or equal to 0 nit but smaller than or equal to 500 nit" in such a way that the luminance is multiplied by 20 and correcting the portion of the first video images that has luminance that does not belong to the expansion target luminance range "greater than or equal to 0 nit but smaller than or equal to 500 nit" in such a way that the luminance is uniformly changed to 10000 nit.

The method for generating the second video information in the HDR0 mode is not limited to the method described above and can be changed as appropriate.

The HDR1 mode is a mode used when the expansion target luminance range (range taken as dynamic range of luminance of first video images) is determined to be "greater than or equal to 0 nit but smaller than or equal to 1000 nit" on the basis of the luminance-related information (MCLL information or MFaLL information).

In the HDR1 mode, the image processing section 14 generates the second video information by expanding the expansion target luminance range of the first video images that is "greater than or equal to 0 nit but smaller than or equal to 1000 nit" (maximum luminance of 1000 nit) to an expanded luminance range that is "greater than or equal to 0 nit but smaller than or equal to 10000 nit" (target maximum luminance of 10000 nit). In the HDR1 mode, the maximum luminance of 1000 nit in the expansion target luminance range of the first video images is converted into the target maximum luminance of 10000 nit.

The degree of expansion of the expansion target luminance range in the HRD1 mode is 10 times. In the HDR1 mode, the image processing section 14 generates the second video information by correcting the portion of the first video images that has luminance that belongs to the expansion target luminance range "greater than or equal to 0 nit but smaller than or equal to 1000 nit" in such a way that the luminance is multiplied by 10 and correcting the portion of the first video images that has luminance that does not belong to the expansion target luminance range "greater than or equal to 0 nit but smaller than or equal to 1000 nit" in such a way that the luminance is uniformly changed to 10000 nit.

The method for generating the second video information in the HDR1 mode is not limited to the method described above and can be changed as appropriate.

The HDR2 mode is a mode used when the expansion target luminance range (range taken as dynamic range of luminance of first video images) is determined to be "greater than or equal to 0 nit but smaller than or equal to 2000 nit" on the basis of the luminance-related information.

In the HDR2 mode, the image processing section 14 generates the second video information by expanding the expansion target luminance range of the first video images that is "greater than or equal to 0 nit but smaller than or equal to 2000 nit" (maximum luminance of 2000 nit) to an expanded luminance range that is "greater than or equal to 0 nit but smaller than or equal to 10000 nit" (target maximum luminance of 10000 nit). In the HDR2 mode, the maximum luminance of 2000 nit in the expansion target luminance range of the first video images is converted into the target maximum luminance of 10000 nit.

The degree of expansion of the expansion target luminance range in the HRD2 mode is 5 times. In the HDR2 mode, the image processing section 14 generates the second video information by correcting the portion of the first video images that has luminance that belongs to the expansion target luminance range "greater than or equal to 0 nit but smaller than or equal to 2000 nit" in such a way that the luminance is multiplied by 5 and correcting the portion of the first video images that has luminance that does not belong to the expansion target luminance range "greater than or equal to 0 nit but smaller than or equal to 2000 nit" in such a way that the luminance is uniformly changed to 10000 nit.

The method for generating the second video information in the HDR2 mode is not limited to the method described above and can be changed as appropriate.

The HDR3 mode is a mode used when the expansion target luminance range (range taken as dynamic range of luminance of first video images) is determined to be "greater than or equal to 0 nit but smaller than or equal to 4000 nit" on the basis of the luminance-related information.

In the HDR3 mode, the image processing section 14 generates the second video information by expanding the expansion target luminance range of the first video images that is "greater than or equal to 0 nit but smaller than or equal to 4000 nit" (maximum luminance of 4000 nit) to an expanded luminance range that is "greater than or equal to 0 nit but smaller than or equal to 10000 nit" (target maximum luminance of 10000 nit). In the HDR3 mode, the maximum luminance of 4000 nit in the expansion target luminance range of the first video images is converted into the target maximum luminance of 10000 nit.

The degree of expansion of the expansion target luminance range in the HRD3 mode is 2.5 times. In the HDR3 mode, the image processing section 14 generates the second video information by correcting the portion of the first video images that has luminance that belongs to the expansion target luminance range "greater than or equal to 0 nit but smaller than or equal to 4000 nit" in such a way that the luminance is multiplied by 2.5 and correcting the portion of the first video images that has luminance that does not belong to the expansion target luminance range "greater than or equal to 0 nit but smaller than or equal to 4000 nit" in such a way that the luminance is uniformly changed to 10000 nit.

The method for generating the second video information in the HDR3 mode is not limited to the method described above and can be changed as appropriate.

The HDR4 mode is a mode used when the expansion target luminance range (range taken as dynamic range of luminance of first video images) is determined to be "greater than or equal to 0 nit but smaller than or equal to 10000 nit" on the basis of the luminance-related information.

In the HDR4 mode, the image processing section 14 generates the second video information by expanding the expansion target luminance range of the first video images that is "greater than or equal to 0 nit but smaller than or equal to 10000 nit" (maximum luminance of 10000 nit) to an expanded luminance range that is "greater than or equal to 0 nit but smaller than or equal to 10000 nit" (target maximum luminance of 10000 nit).

The degree of expansion of the expansion target luminance range in the HRD4 mode is 1 times. In the HDR4 mode, since the expansion factor of the luminance range is 1, the luminance range of the first video images that is "greater than or equal to 0 nit but smaller than or equal to 10000 nit" substantially functions as a "luminance range to be maintained" instead of the expansion target luminance range.

The degrees of expansion in the HDR0, HDR1, HDR2, HDR3, and HDR4 modes are not limited to 20, 10, 5, 2.5, and 1, respectively, and can be changed as appropriate to the extent that the degree of expansion decreases in the order of the HDR0, HDR1, HDR2, HDR3, and HDR4 modes.

The action of the display apparatus in the first embodiment will next be described.

Figure 4:
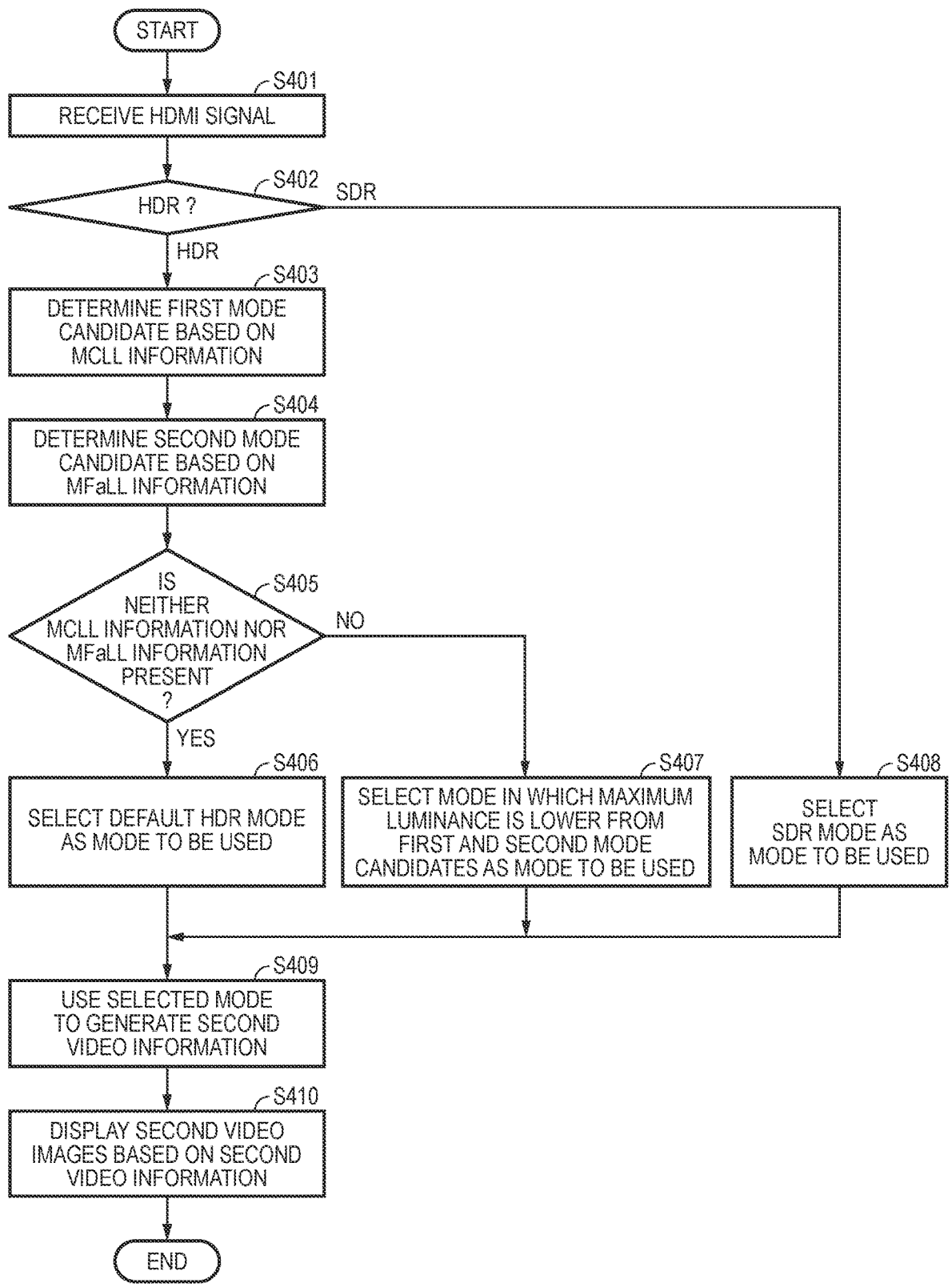
FIG. 4 is a flowchart for describing the action of display apparatus in the first embodiment.

FIG. 4 is a flowchart for describing the action of the display apparatus in the first embodiment.

The receiving section 11, when it receives an HDMI signal (step S401), supplies the analyzing section 12 with Info Frame contained in the HDMI signal and supplies the image processing section 14 with the first video information contained in the HDMI signal.

The analyzing section 12 analyzes Info Frame and reads information written in Info Frame. The analyzing section 12 supplies the video processing section 14 with the information read from Info Frame.

The image processing section 14, when it receives the information from the analyzing section 12, evaluates whether the first video images comply with the HDR method or the SDR method on the basis of the EOTF information, which is part of the received information (step S402).

In the case where the first video images comply with the HDR method, the image processing section 14 refers to the lookup table LUT1 and determines, as a first mode candidate, an HDR mode corresponding to the MCLL information, which is part of the information received from the analyzing section 12 (step S403). In a case where no MCLL information is present in the information received from the analyzing section 12, the image processing section 14 skips through step S403.

The image processing section 14 subsequently refers to the lookup table LUT1 and determines, as a second mode candidate, an HDR mode corresponding to the MFaLL information received from the analyzing section 12 (step S404). In a case where no MFaLL information is present in the information received from the analyzing section 12, the image processing section 14 skips through step S404.

The image processing section 14 subsequently evaluates whether or not neither MCLL information nor MFaLL information is present in the information received from the analyzing section 12 (step S405).

In the case where neither MCLL information nor MFaLL information is present in the information received from the analyzing section 12 (Yes in step S405), the image processing section 14 selects a default HDR mode as the mode to be used (step S406). It is assumed in the following description that the HDR2 mode has been specified in advance as the default HDR mode. The default HDR mode is not limited to the HDR2 mode and can be changed as appropriate.

On the other hand, in a case where the MCLL information and the MFaLL information are both present in the information received from the analyzing section 12 (No in step S405), the image processing section 14 selects one of the first mode candidate and the second mode candidate, the mode candidate in which the maximum luminance in the expansion target luminance range corresponding to the mode candidate is lower, as a mode to be used (step S407).

In a case where the maximum luminance in the expansion target luminance range corresponding to the first mode candidate is equal to the maximum luminance in the expansion target luminance range corresponding to the second mode candidate, that is, in a case where the first mode candidate and the second mode candidate are the same HDR mode, the image processing section 14 selects the same HDR mode as the mode to be used.

Another situation in which a result of the evaluation in step S405 shows No is conceivably a case where only one of the MCLL information and the MFaLL information is present in the information received from the analyzing section 12. In this case, since one of steps S403 and S404 has been carried out, one of the first and second mode candidates has been determined as the mode to be used. The image processing section 14 therefore selects the determined one of the first and second mode candidates as the mode to be used.

In the case where the first video images comply with the SDR method in step S402, the image processing section 14 selects the SDR mode as the mode to be used (step S408).

Having selected the mode to be used (step S406, S407, or S408), the image processing section 14 uses the selected mode to generate the second video information (step S409). The method for generating the second video information in each of the HDR0 to HDR4 modes has been described above. Further, the method for generating the second video information in the SDR mode is a known technology and will not therefore be described.

The image processing section 14 subsequently supplies the display section 20 with the second video information. The display section 20 displays second video images on the basis of the second video information (step S410).

According to the present embodiment, the image processing section 14 generates the second video information representing the second video images by expanding the expansion target luminance range of the first video images in such a way that the maximum luminance in the expansion target luminance range of the first video images increases. The second video images can thus be brighter than the first video images and have contrast higher than that of the first video images.

Further, the image processing section 14 selects a mode candidate for each of the MCLL information and the MFaLL information. In the HDR modes used as the mode candidates, the expansion target luminance range has been determined on an HDR mode basis. The selection of a mode candidate for each of the MCLL information and the MFaLL information therefore means determination of the expansion target luminance range on a luminance-related information basis.

The image processing section 14 then selects one of the first and second mode candidates, the mode candidate in which the maximum luminance in the corresponding expansion target luminance range is lower, as the mode to be used and uses the selected mode to generate the second video information. The process described above means that the image processing section 14 generates the second video information by expanding one of the expansion target luminance ranges provided on a luminance-related information basis, the expansion target luminance range having lower maximum luminance in such a way that the maximum luminance in the expansion target luminance range having the lower maximum luminance increases.

The process described above allows the second video images to be brighter and the contrast of the second video images to be higher than in a case where the second video information is generated by expanding the expansion target luminance range having the higher maximum luminance.

Further, when the receiving section 11 receives no luminance-related information but receives the first video information, that is, when a result of the evaluation in step S405 shown in FIG. 4 shows Yes, the image processing section 14 selects the default HDR mode as the mode to be used and uses the selected mode to generate the second video information.

Therefore, even when the receiving section 11 receives no luminance-related information, the expansion target luminance range can be determined, and the luminance range can be expanded.

Second Embodiment

In the first embodiment, the MCLL information and the MFaLL information are used as the luminance-related information.

In a second embodiment, the MaxDML information is further used as the luminance-related information. The MaxDML information is used to select a mode to be used in the case where neither the MCLL information nor the MFaLL information is written in Info Frame.

Figure 5:
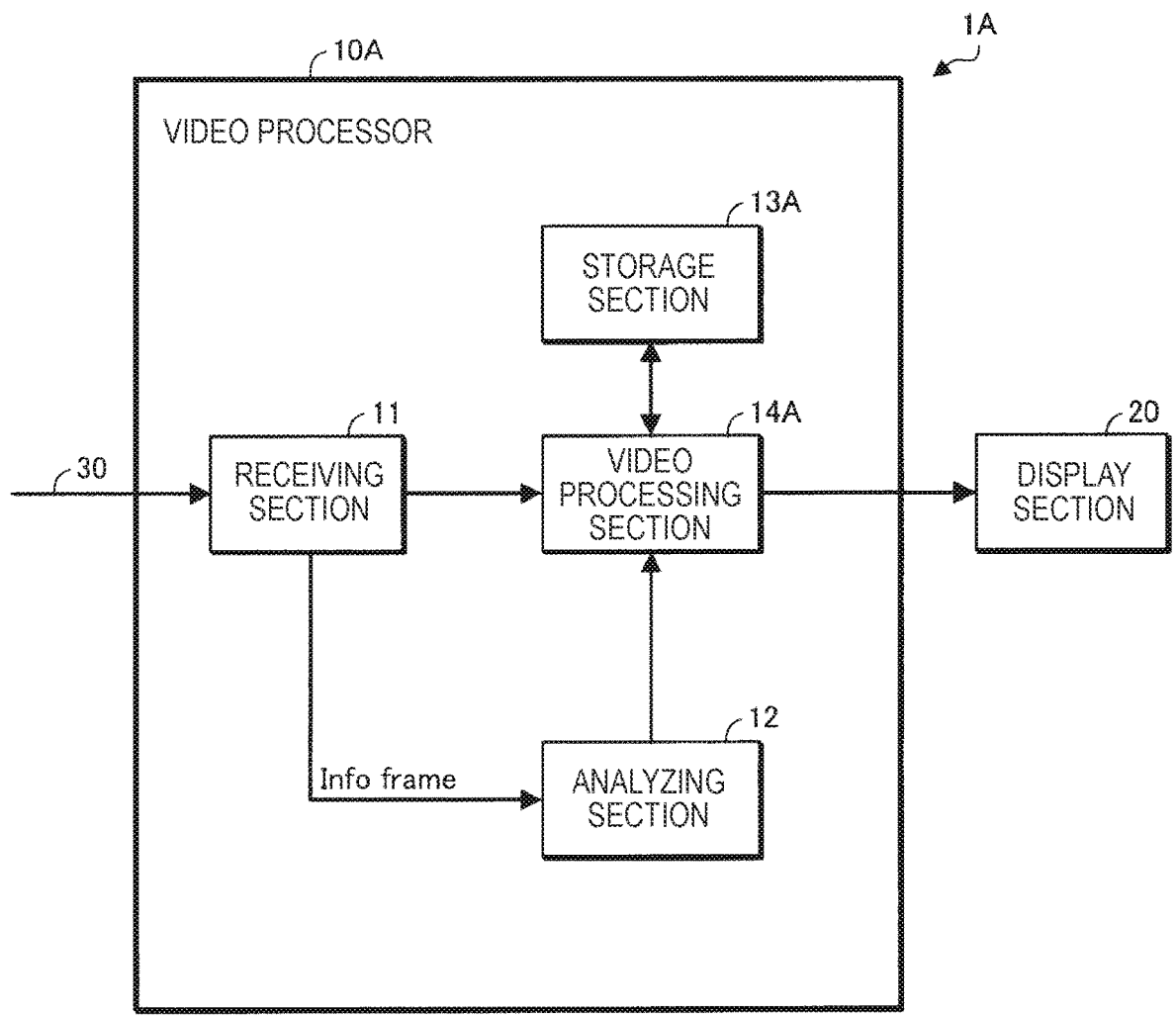
FIG. 5 is a block diagram showing a display apparatus according to a second embodiment.

FIG. 5 shows a display apparatus 1A according to the second embodiment that adopts the invention. In FIG. 5, the same configurations as those shown in FIG. 1 have the same reference characters.

The display apparatus 1A according to the second embodiment differs from the display apparatus 1 according to the first embodiment in that a video processor 10A is provided in place of the video processor 10. The display apparatus 1A according to the second embodiment will be described below primarily on differences from the display apparatus 1 according to the first embodiment.

The video processor 10A differs from the video processor 10 shown in FIG. 1 in that the video processor 10A includes a storage section 13A in place of the storage section 13 and a video processing section 14A in place of the video processing section 14.

The storage section 13A stores a lookup table LUT2 shown in FIG. 6 in addition to the lookup table LUT1 shown in FIG. 2. In the lookup table LUT2, the MaxDML information, which is luminance-related information, the expansion target luminance range of the first video images, and the expanded luminance range thereof are related to one another on an HDR mode basis (for each of HDR0 to HDR4 modes). For example, the MaxDML information greater than or equal to 2000 nit but smaller than 4000 nit is related to the expansion target luminance range greater than or equal to 0 nit but smaller than or equal to 4000 nit and the expanded luminance range greater than or equal to 0 nit but smaller than or equal to 10000 nit.

When the receiving section 11 receives at least one of the MCLL information and the MFaLL information, the image processing section 14A refers to the lookup table LUT1 and determines the expansion target luminance range on the basis of the received information. The determination method is the same method described in the first embodiment.

When the receiving section 11 receives neither the MCLL information nor the MFaLL information but receives the MaxDML information, the image processing section 14A refers to the lookup table LUT2 and determines the expansion target luminance range corresponding to the MaxDML information.

The action of the display apparatus in the second embodiment will next be described.

Figure 7:
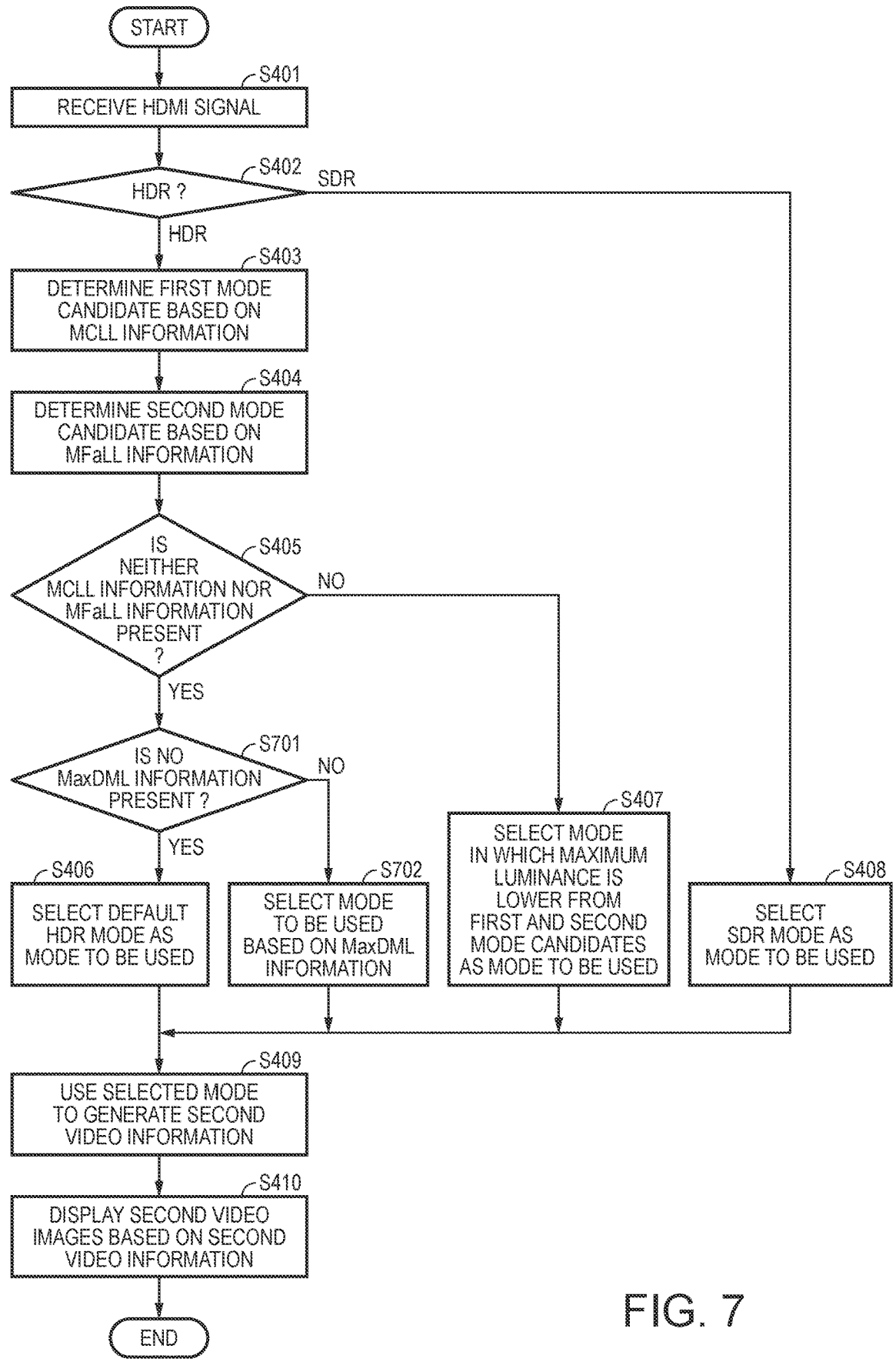
FIG. 7 is a flowchart for describing the action of a display apparatus according to the second embodiment.

FIG. 7 is a flowchart for describing the action of the video processor 10A in the second embodiment. In FIG. 7, the same processes as those shown in FIG. 4 have the same reference characters. The action of the display apparatus in the second embodiment will be described primarily on processes different from those shown in FIG. 4.

When a result of the evaluation in step S405 is Yes, that is, when neither MCLL information nor the MFaLL information is present in the information received from the analyzing section 12, the video processing section 14A evaluates whether or not the MaxDML information is present in the information received from the analyzing section 12 (step S701).

In the case where no MaxDML information is present in the information received from the analyzing section 12 (Yes in step S701), the video processing section 14A carries out step S406.

On the other hand, in the case where the MaxDML information is present in the information received from the analyzing section 12 (No in step S701), the video processing section 14A refers to the lookup table LUT2 and determines an HDR mode corresponding to the MaxDML information as the mode to be used (step S702).

When the HDR mode is determined, the expansion target luminance range used in the HDR mode is uniquely determined. The determination of an HDR mode corresponding to the MaxDML information as the mode to be used therefore means determination of the expansion target luminance range on the basis of the MaxDML information.

Having determined the mode to be used, the video processing section 14A carries out step S409.

According to the present embodiment, as the luminance-related information used to determine the expansion target luminance range, the MCLL information and the MFaLL information are allowed to have priority over the MaxDML information.

The MCLL information and the MFaLL information change in accordance with the luminance of the first video images themselves, whereas the MaxDML information does not change with the luminance of the first video images themselves but changes with the maximum luminance that the luminance of the first video images can take on.

Therefore, in the present embodiment, the MCLL information or the MFaLL information, which is more likely to represent the luminance range of the first video images than the MaxDML information, is used to determine the expansion target luminance range. The degree of coincidence between the expansion target luminance range and the dynamic range of luminance of the first video images can therefore be increased.

When a higher degree of coincidence between the expansion target luminance range and the dynamic range of luminance of the first video images is achieved, second video information representing brighter, higher-contrast second video images can be generated with degradation in the second video images due to the expansion of the luminance range suppressed.

Variations

The embodiments described above can be changed in a variety of manners. Specific aspects of the variations will be presented below by way of example. Two or more aspects arbitrarily selected from the following examples can be merged into one aspect as appropriate to the extent that the selected aspects do not contradict each other.

Variation 1

In the first embodiment, the image processing section 14 selects, as the expansion target luminance range, one of an expansion target luminance range determined on the basis of the MCLL information (hereinafter referred to as "first candidate") and an expansion target luminance range determined on the basis of the MFaLL information (hereinafter referred to as "second candidate"), that is, the expansion target luminance range having lower maximum luminance.

The image processing section 14 may select, as the expansion target luminance range, one of the first candidate, the second candidate, and the expansion target luminance range determined on the basis of the MaxDML information (hereinafter referred to as "third candidate"), that is, the expansion target luminance range having the lowest maximum luminance.

Variation 2

In the second embodiment, in the case where none of the two pieces of information described above, neither the MCLL information nor the MFaLL information, is present, the video processing section 14A determines the mode to be used on the basis of the MaxDML information.

Conversely, the video processing section 14A may allow the MaxDML information to have priority over the MCLL information and the MFaLL information, and in the case where no MaxDML information is present, the video processing section 14A may determine the mode to be used on the basis of the MCLL information or the MFaLL information.

Variation 3

The number of modes is not limited to five and can be changed as appropriate. The values shown in the lookup tables LUT1 and LUT2 can be changed as appropriate.

Variation 4

In each of the embodiments described above, the expansion target luminance range is changed stepwise on the basis of the luminance-related information. The expansion target luminance range may instead be linearly changed on the basis of the luminance-related information.

Variation 5

In step S407, at least one of the video processing sections 14 and 14A may select, as the mode to be used, one of the first mode candidate and the second mode candidate, the mode candidate in which the maximum luminance in the expansion target luminance range corresponding to the mode candidate is higher, instead of the mode candidate in which the maximum luminance is lower.

This process means that at least one of the video processing sections 14 and 14A generates the second video information by expanding one of the expansion target luminance ranges provided on a luminance-related information basis, the expansion target luminance range having higher maximum luminance in such a way that the maximum luminance in the expansion target luminance range having the higher maximum luminance increases.

In this case, saturation of luminance due to the expansion of the luminance range can be suppressed, as compared with the case where the second video information is generated by expanding the expansion target luminance range having lower maximum luminance.

Variation 6

The order in accordance with which the processes in step S403 and step S404 are carried out may be swapped.

Variation 7

Step S405 may be carried out before step S403. In this case, when a result of the evaluation in step S405 shows No, step S403 is carried out, and step S407 is carried out after step S404.

Variation 8

In each of the embodiments described above, an HDMI signal is used as the signal containing the first video data and the luminance-related information, but the signal containing the first video data and the luminance-related information is not limited to an HDMI signal and can be changed as appropriate.

Variation 9

At least one of the image processors 10 and 10A may not be integrated with the display section 20 and may be separate therefrom.

Variation 10

At least one of the display apparatus 1 and 1A is not limited to a projector and can be changed as appropriate. For example, the display apparatus 1 may be a liquid crystal display apparatus (LCD). In this case, the display section 20 has a display screen and displays video images on the display screen.

Variation 11

Entirety or part of the video processing sections 14, 14A and the analyzing section 12 may be achieved by using a dedicated electronic circuit or may be achieved by a CPU or any other computer that reads a program from a computer readable recording medium and executes the program.

What is claimed is:

1. A video processing method comprising:
   receiving video information representing video images and luminance-related information on luminance of the video images, the luminance-related information being formed of a plurality of types of luminance-related information;
   determining an expansion target luminance range of the video images for each of the types of luminance-related information based on the luminance-related information;
   selecting one expansion target luminance range out of the determined expansion target luminance ranges that has a low maximum luminance threshold; and
   expanding the selected one expansion target luminance range by increasing the maximum luminance in the selected one expansion target luminance range having the low maximum luminance threshold.

2. The video processing method according to claim 1, wherein the expansion target luminance range is expanded in such a way that the maximum luminance in the expansion target luminance range is equal to a pre-specified target maximum luminance that is higher than the maximum luminance.

3. The video processing method according to claim 2, wherein the maximum luminance is lowered in the expansion target luminance range by a greater amount when luminance represented by the luminance-related information is lower.

4. The video processing method according to claim 1, wherein the plurality of types of luminance-related information are formed of maximum luminance information representing maximum luminance of the video images and maximum average luminance information representing a maximum of average luminance values of frames that form the video images.

5. The video processing method according to claim 1, wherein the plurality of types of luminance-related information include at least one of: (a) maximum luminance information representing maximum luminance of the video images, (b) maximum average luminance information representing a maximum of average luminance values of frames that form the video images, and/or (c) point-of-editing maximum luminance information representing maximum luminance of light from a display apparatus used when the video images are edited.

6. A video processing method comprising:
receiving video information representing video images and luminance-related information on luminance of the video images, the luminance-related information being formed of a plurality of types of luminance-related information;
determining an expansion target luminance range of the video images for each of the types of luminance-related information based on the luminance-related information;
selecting one expansion target luminance range out of the determined expansion target luminance ranges that has a high maximum luminance threshold; and
expanding the selected one expansion target luminance range by increasing the maximum luminance in the selected one expansion target luminance range having the high maximum luminance threshold.

7. The video processing method according to claim 6, wherein the expansion target luminance range is expanded in such a way that the maximum luminance in the expansion target luminance range is equal to a pre-specified target maximum luminance that is higher than the maximum luminance.

8. The video processing method according to claim 7, wherein the maximum luminance is lowered in the expansion target luminance range by a greater amount when luminance represented by the luminance-related information is lower.

9. The video processing method according to claim 6, wherein the plurality of types of luminance-related information are formed of maximum luminance information representing maximum luminance of the video images and maximum average luminance information representing a maximum of average luminance values of frames that form the video images.

10. The video processing method according to claim 6, wherein the plurality of types of luminance-related information include at least one of: (a) maximum luminance information representing maximum luminance of the video images, (b) maximum average luminance information representing a maximum of average luminance values of frames that form the video images, and/or (c) point-of-editing maximum luminance information representing maximum luminance of light from a display apparatus used when the video images are edited.

11. A video processing method comprising:
receiving video information representing video images and luminance-related information on luminance of the video images, the luminance-related information being formed of a plurality of types of luminance-related information; and
determining an expansion target luminance range of the video images based on the luminance-related information and expanding the expansion target luminance range in such a way that maximum luminance in the expansion target luminance range increases, wherein
the plurality of types of luminance-related information include maximum luminance information representing maximum luminance of the video images, maximum average luminance information representing a maximum of average luminance values of frames that form the video images, and point-of-editing maximum luminance information representing maximum luminance of light from a display apparatus used when the video images are edited, and
when at least one of the maximum luminance information and the maximum average luminance information is received, the expansion target luminance range is determined based on the received information,
when neither the maximum luminance information nor the maximum average luminance information is received but the point-of-editing maximum luminance information is received, the expansion target luminance range is determined based on the point-of-editing maximum luminance information.

12. The video processing method according to claim 11, wherein the expansion target luminance range is expanded in such a way that the maximum luminance in the expansion target luminance range is equal to a pre-specified target maximum luminance that is higher than the maximum luminance.

13. The video processing method according to claim 12, wherein the maximum luminance is lowered in the expansion target luminance range by a greater amount when luminance represented by the luminance-related information is lower.

* * * * *